(12) United States Patent
Bronson

(10) Patent No.: US 11,209,120 B1
(45) Date of Patent: *Dec. 28, 2021

(54) CAMERA MOUNT PLATE AND MODULE ACCESS SLIDE FOR POLES USED FOR ROADSIDE ELECTRONIC SYSTEMS

(71) Applicant: Glenn Joseph Bronson, Chelmsford, MA (US)

(72) Inventor: Glenn Joseph Bronson, Chelmsford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/107,957

(22) Filed: Dec. 1, 2020

Related U.S. Application Data

(63) Continuation of application No. 16/414,755, filed on May 16, 2019, now Pat. No. 10,851,936.

(60) Provisional application No. 62/672,078, filed on May 16, 2018.

(51) Int. Cl.
| *F16M 11/22* | (2006.01) |
| *G08B 13/196* | (2006.01) |
| *G03B 17/56* | (2021.01) |
| *F16M 13/02* | (2006.01) |

(52) U.S. Cl.
CPC ............ *F16M 11/22* (2013.01); *F16M 13/02* (2013.01); *G03B 17/561* (2013.01); *G08B 13/19632* (2013.01)

(58) Field of Classification Search
None
See application file for complete search history.

(56) References Cited

U.S. PATENT DOCUMENTS

| 4,046,226 | A | 9/1977 | Flinchbaugh |
| 4,529,062 | A | 7/1985 | Lamprey |
| 6,447,150 | B1 | 9/2002 | Jen |
| 7,004,043 | B2 | 2/2006 | Erel |
| 2015/0043202 | A1 | 2/2015 | Kosedag |
| 2016/0146438 | A1 | 5/2016 | LaFermina |
| 2019/0301196 | A1 | 10/2019 | Reed |

FOREIGN PATENT DOCUMENTS

WO    WO-2007104904 A1 * 9/2007 .............. F21V 23/02

* cited by examiner

*Primary Examiner* — Clayton E. LaBalle
*Assistant Examiner* — Leon W Rhodes, Jr.
(74) *Attorney, Agent, or Firm* — Adibi IP Group, PC; Amir V. Adibi; Andrew C. Palmer

(57) ABSTRACT

A system comprises a pole, a conduit track, and a sliding assembly that slides along the conduit track. The pole is configured to support an optical system that includes a camera or antenna. The sliding assembly and conduit track are disposed within an interior of the pole. The sliding assembly supports electrical components used in operation of the optical system, such as power components, storage devices, and communication modules. Cables extend from the optical system, through the conduit track, and to the electrical components supported by the sliding assembly. An access opening along the pole provides an operator easy access to the electrical components. Moreover, all of the electrical components and cables are disposed within the pole and protected from outside elements. The system allows electronic systems power and optics to be deployed in a cost effective, efficient and secure manner in locations alongside roads and other access ways.

18 Claims, 11 Drawing Sheets

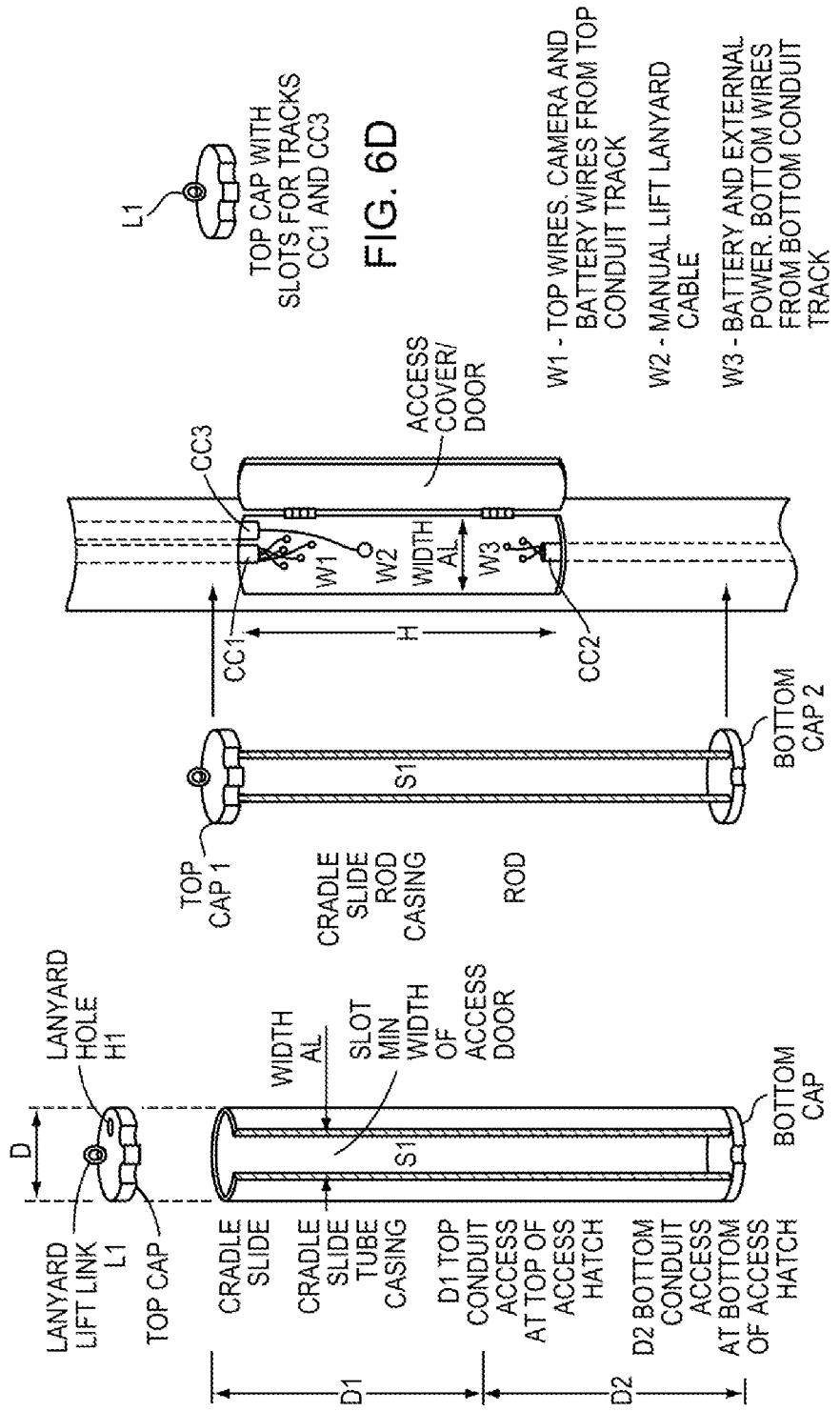

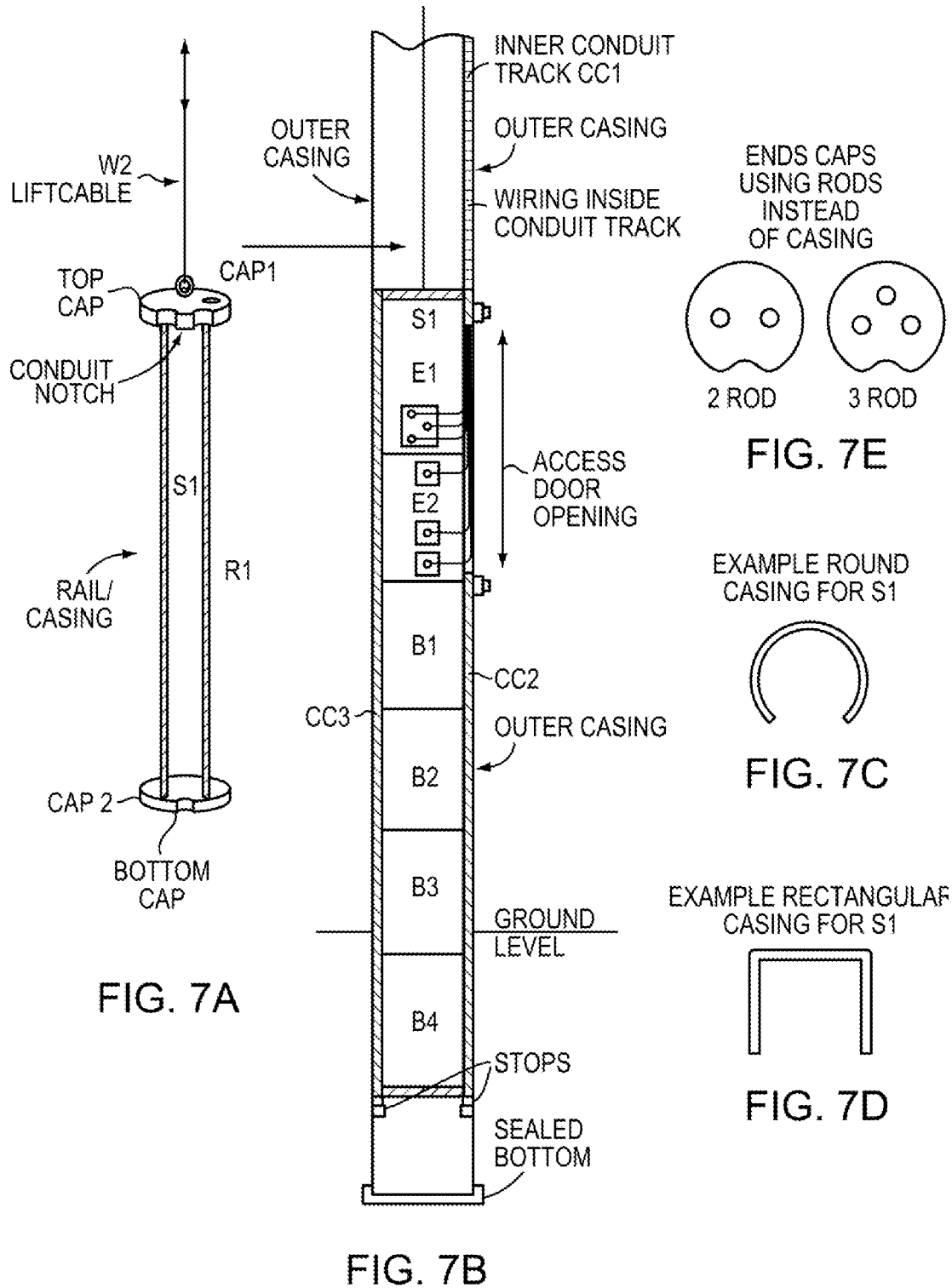

CAMERA MOUNT PLATE AND MODULE ACCESS SLIDE FOR POLES USED FOR ROADSIDE ELECTRONIC SYSTEMS

CROSS REFERENCE TO RELATED APPLICATION

This application is a continuation of, and claims priority under 35 U.S.C. § 120 from, U.S. Nonprovisional patent application Ser. No. 16/414,755 entitled "Camera Mount Plate And Module Access Slide For Poles Used For Roadside Electronic Systems," now U.S. Pat. No. 10,851,936, filed on May 16, 2019. U.S. Nonprovisional patent application Ser. No. 16/414,755 in turn claims the benefit under 35 U.S.C. § 119 of U.S. Provisional Patent Application Ser. No. 62/672,078, entitled "Camera Mount Plate And Module Access Slide For Poles Used For Roadside Camera And Audio Systems," filed on May 16, 2018. The entire subject matter of the aforementioned patent documents is incorporated herein by reference.

TECHNICAL FIELD

The described embodiments relate generally to optical support systems, and more particularly to optical support systems deployed in outdoor settings.

BACKGROUND INFORMATION

In urban areas such as cities, cameras and antennas are abundant and mounted on street poles and buildings, offering good coverage of access ways, while allowing easy access to power, networks access, and maintenance service. Rural areas do not benefit from such easy coverage. This is due to many reasons, including: cost of installation due to inconvenient mounting/viewing/vantage points, lack of available power, setbacks due to regulations, and large distances between desired locations. Location of cameras is critical, especially when profiling traffic or trying to solve a crime. Details such as the person's face or vehicle should be clear for identification: this is essential in crime solving: the characteristics of the person or the make and license plate of the vehicle in question should be identifiable. Some of the major problems then become the distance of the camera from the access way, camera angle, power supply, and vulnerability to damage and vandalism.

More often than not, camera systems are combined with radio antennas for their own access networks. Most require a dedicated pole set in the desired location to serve as either a camera mount, antenna, or both.

As next generation wireless access networks become more widely deployed, these poles will most likely serve as camera platforms, 5G access points, and a host to other types of roadside sensors and equipment. Location of antennas such as those used by the camera, 5G, Wifi, DAS, or other radio repeaters is also critical to obtain desired coverage as well as access to Macro Cell towers providing radio link backhauls. The requirement of a battery system for backup or solar also may come into play. Access for serviceability and cost associated with servicing large numbers of poles that are located distances apart also becomes a problem. In addition, local ordinances may require that the pole and equipment meet certain aesthetic requirements. Designing for these considerations adds complexity and cost to the solution.

SUMMARY

A system comprises a pole, a conduit track, and a sliding assembly that slides along the conduit track. The pole is configured to support an optical system that includes a camera or antenna. The sliding assembly and conduit track are disposed within an interior of the pole. The sliding assembly supports electrical components used in operation of the optical system, such as power components, storage devices, and communication modules. Cables extend from the optical system, through the conduit track, and to the electrical components supported by the sliding assembly. An access opening along the pole provides an operator easy access to the electrical components. In addition, all of the electrical components and cables are disposed within the pole. This provides protection to the electrical components and cables from the outside environment, including unfavorable weather and potential tampering.

It is generally desirable to place the camera or acquisition system in the best location as possible. Many times this is as close to the access way as possible. For example, on a stand alone pole on or near the easement, within a road sign, or mailbox pole. The straightforward solution for an antenna is usually to mount it as high as possible in the desired coverage location, working around line of sight obstacles that inhibit line of sight for both coverage and access to the macro backhaul. If power is required and/or wired/fiber network connections, this further complicates the deployment.

Prior art lacks a way to add and upgrade equipment, and maintain large numbers of these poles in a cost effective and reliable manner. This system comprises a module access slide that fits inside a pole, that solves these problems.

In this document, camera refers to both analog and digital cameras with lens and minimal electronic support required to operate, as well as modern digital electronic camera systems with lens, and support electronics: that may include a microprocessor, some or all of the electronics to operate, and some or all of its power supply and battery power. This system is an improvement and extension in the deployment of these components with improvements to the system within the supporting pole.

In this document, camera refers to both analog and digital cameras with lens and minimal electronic support required to operate, as well as modern digital electronic camera systems with lens, and support electronics: that may include a microprocessor, some or all of the electronics to operate, and some or all of its power supply and battery power. This system is an improvement and extension in the deployment of these components with improvements to the system within the supporting pole.

For illustrative purposes, in this document an antenna refers to a pole with a radio system associated with it that may serve as network access to and from the camera or other acquisition device at the pole, or serve as stand alone access point for WIFI or 5G without a camera or access device, or comprise of a combination of both. In various embodiments the pole hosting other combinations of antennas and devices are possible.

A pole is defined as any column supporting a camera and/or antenna system that has one end on a base on the ground, is embedded in the ground, or extends outward from a building or support column. As shown in FIGS. 1 through 4.

US Standard building construction 2×4 stud is 3.74" in width and 1.75" in depth. Standard construction 4×4 post is 3.75" by 3.75". US standard construction tubing and piping for poles vary in OD and ID depending on the construction or plumbing dimensions, schedule and thickens and material used: metal or plastic. Camera poles vary in dimension using both standard and non standard diameters depending on the size and required loading of the pole.

The camera system or antenna is mounted on the surface of the pole anywhere along the length of the pole which is oriented either vertical or horizontal or any angle in between.

Further details, embodiments, methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 6A, 6B, 6C, and 6D show various embodiments of a sliding assembly.

FIGS. 7A, 7B, 7C, 7D, and 7E show various embodiments of the system.

DETAILED DESCRIPTION

Reference will now be made in detail to background examples and some embodiments of the invention, examples of which are illustrated in the accompanying drawings.

Figure 1:
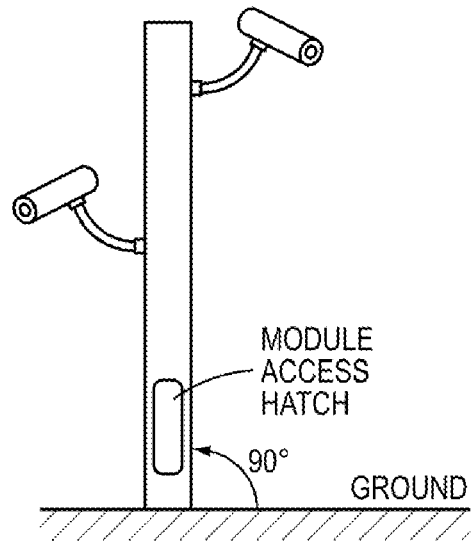
FIG. 1 is a diagram of one embodiment of the novel system.
Figure 2:
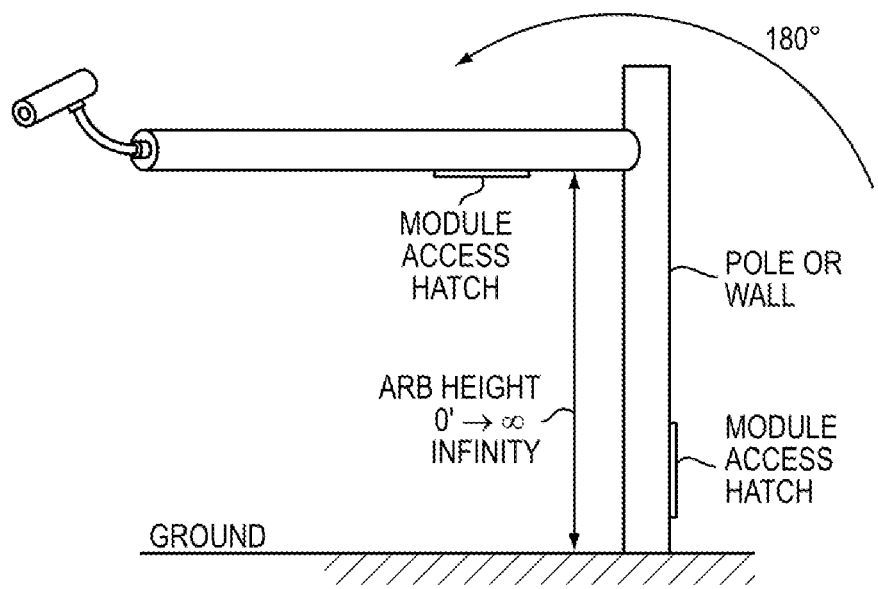
FIG. 2 is a diagram of another embodiment of the novel system.

For illustrative purposes FIG. 1 and FIG. 2 show different embodiments deployed at 90 degrees relative to ground reference and 180 degrees relative to ground reference. For illustrative purposes in FIG. 1 the mounted camera is a round external enclosure type on the top right and middle left of the pole, but any camera shape or form factor can be used and attached to the surface of the pole, with its supporting electronic power system and batteries inside the pole.

For illustrative purposes FIG. 2 has a mounted camera of the round external enclosure type mounted at the end of the pole with an access hatch facing the ground beneath, the pole being attached perpendicular (180 degrees) to a second pole of arbitrary height which also has an access hatch. Both module hatches can be at any location along the length of the poles and from 0 to 360 degrees around the circumference of the pole. The second pole may be replaced by a wall, building, or other structure.

Figure 3:
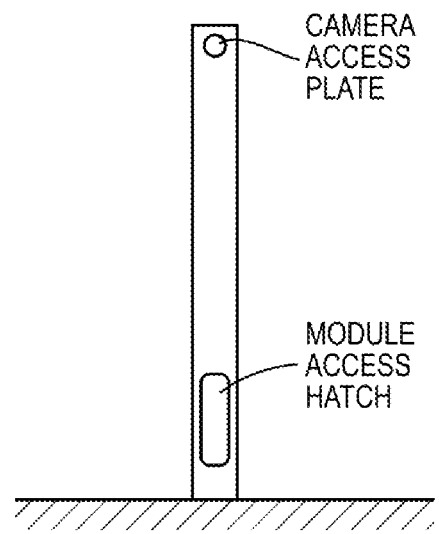
FIG. 3 is a diagram that shows a module access hatch and a camera access plate in accordance with one novel aspect.
Figure 4:
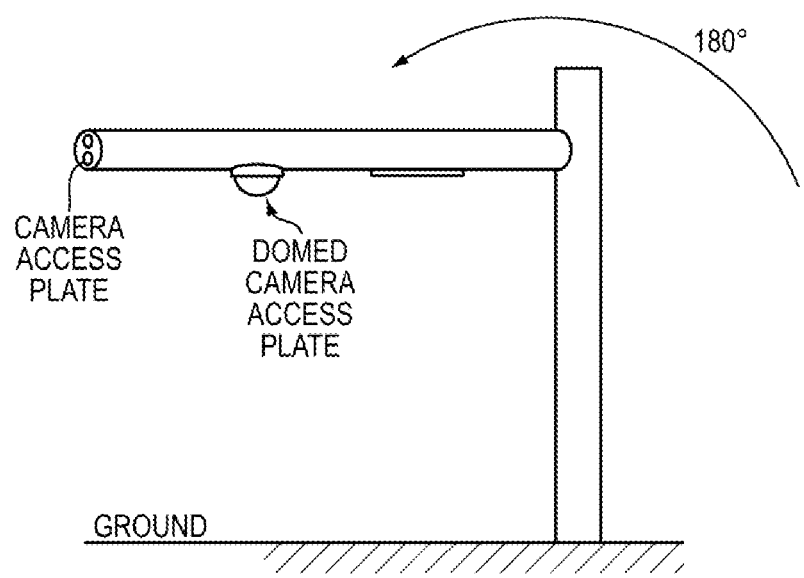
FIG. 4 is a diagram that shows a camera access plate and a domed camera access plate in accordance with another novel aspect.

For illustrative purposes FIG. 3 shows the camera system mounted with a camera access plate within the pole at one end, and FIG. 4 shows the camera system mounted with a camera access plate with dual lenses within the end of the pole.

Figure 5A:
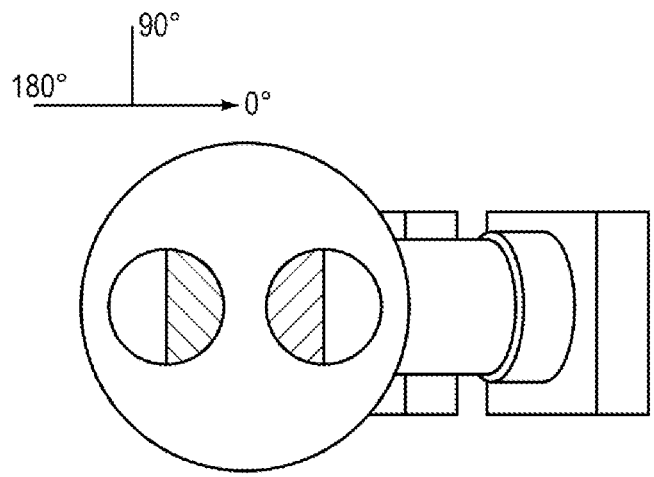
FIGS. 5A, 5B, and 5C shows various embodiments of an optical system.
Figure 5B:
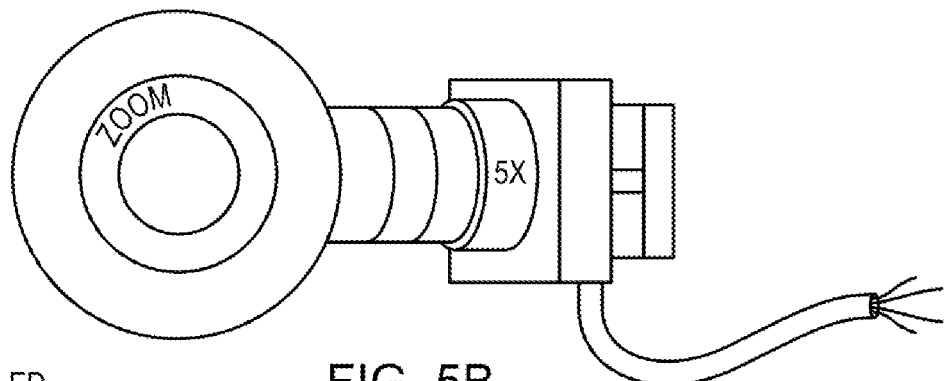
Figure 5C:
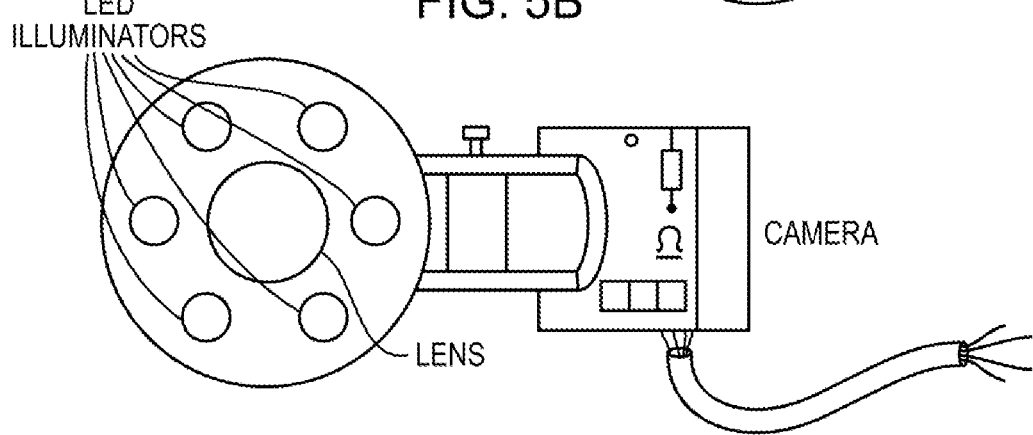

For illustrative examples that follow, a round camera access plate will be shown. Examples of lenses may be dual split view lenses that can be rotated to look from 0 to 360 degrees, an illustrative example of this is FIG. 5a in which there are two lenses and two cameras, each looking 180 degrees to left and right. FIG. 5b shows with a remote control zoom lens, and FIG. 5c with a camera lens with LED illuminators mounted through the access plate.

Figure 8A:
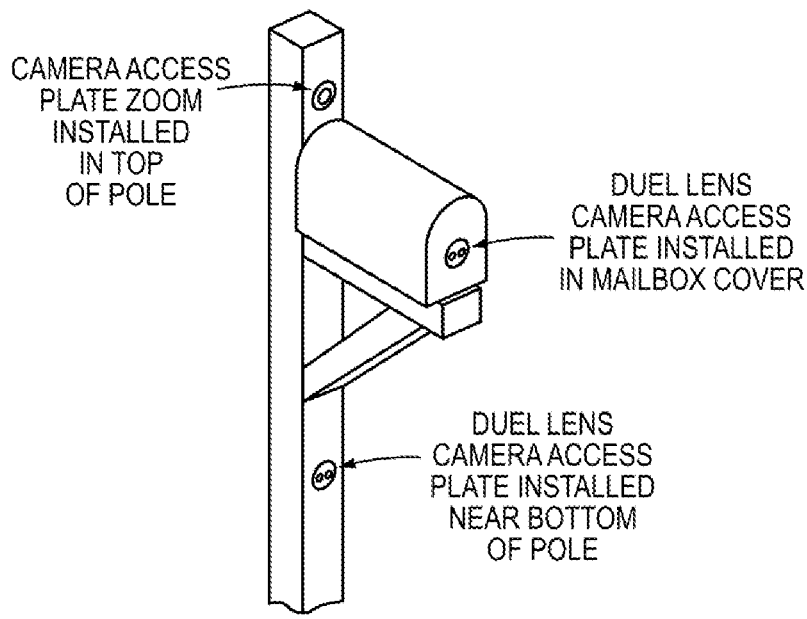
FIGS. 8A and 8B show various configurations of how an optical system attaches to the pole in various embodiments.
Figure 8B:
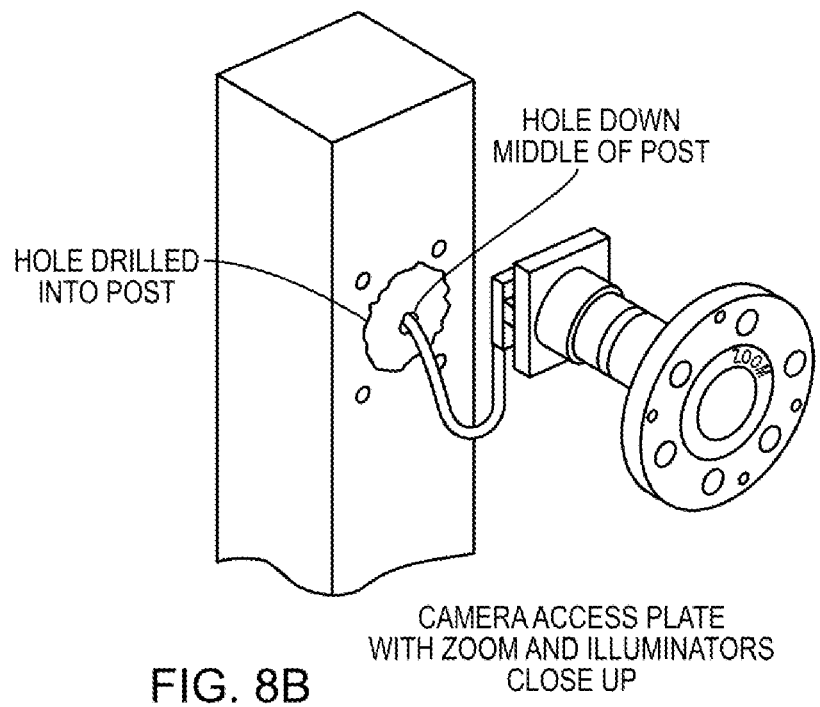

The camera mount plate embodiment does not have to go into a pipe or pipe fitting but may be installed in existing structures, devices and objects. Because it is within standard dimensional material sizes, the camera plate access plate may go into a standard pipe or tube fitting, as well as within dimensional lumber and construction materials. An illustrative example is FIG. 8a in which can be installed into a mailbox door, or a standard 4×4 (3.75") mailbox pole in FIG. 8b, or other structure. The camera is then wired to its support electronics and power supply. In various embodiments this system may be incorporated into a prefabricated mailbox pole which either has a mailbox built in or included, or allows a separate mailbox to be attached.

Figure 9:
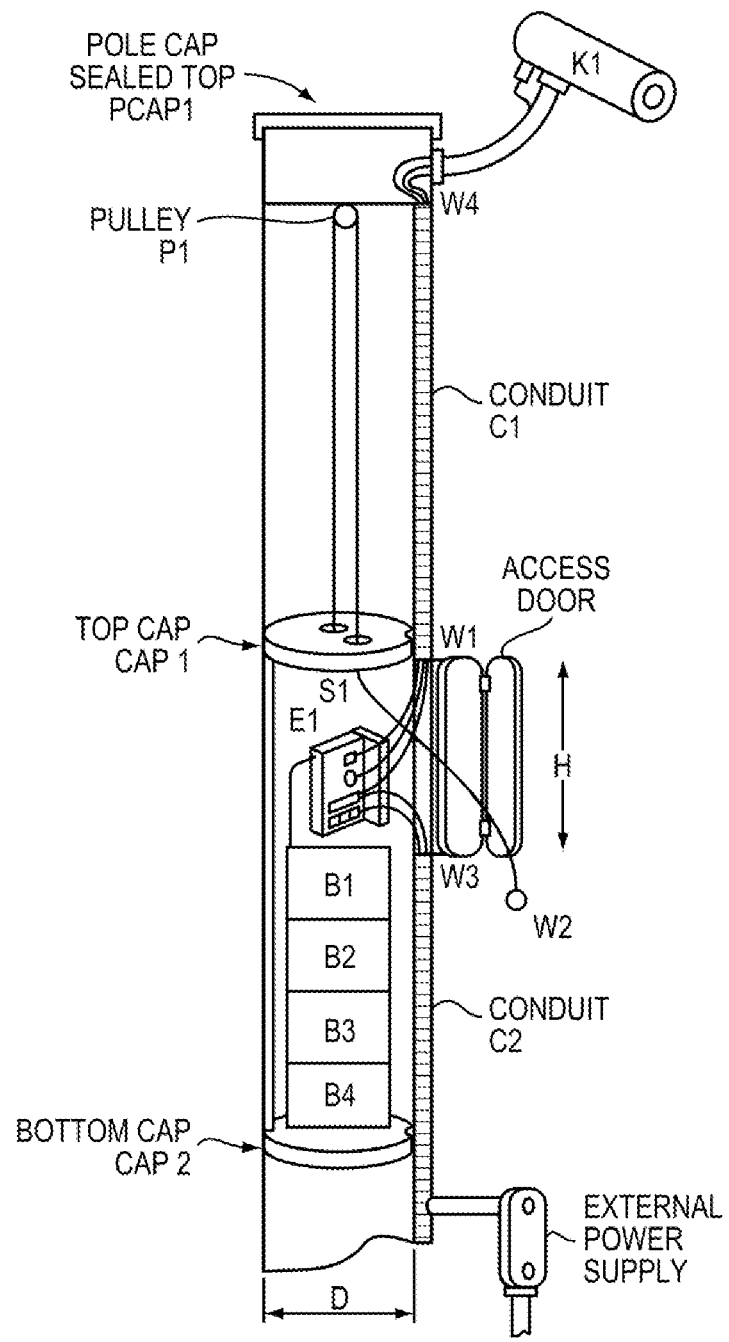
FIG. 9 is a diagram that shows an interior view of the pole in accordance with one novel embodiment.

FIGS. 6, 7, and 9 show embodiments of the module slide mechanism of the system containing one or more battery and support electronic modules, with a diameter D of 3.5" in diameter or less for small poles, that fits within enclosures built with these standard building dimensions, or other custom enclosure built with these or larger dimension poles.

In various embodiments the slide or the modules in it may be more or less than 3.5" in diameter and more or less than 3.5" X and Y square or rectangular dimensions.

In various embodiments the modules within the slide of this system may occupy larger diameters or larger X and Y dimensions by putting modules side by side or in other configurations.

As illustrated in FIGS. 1, 2, 3 and 4, in various embodiments this system may be used within both vertical and horizontal poles used for a camera system.

As shown in FIG. 9, one or more modules that fits through an opening (module access hatch, access door) in a pipe, rectangle, square, or other construction shape that is used as a pole or support column for a camera, solar panel, or other device; that slides upwards or downwards within the inner space that is serviceable and removable from an opening in the side or stop of the pipe; that are connectable mechanically or electrically. In this case Slide S1 contains electronic module E1 and stacked battery modules B1 B2 B3 and B4. The order of stacking of modules within the slide may be in any order.

FIGS. 6 and 7 show the module cradle slides of the system, S1 that allow insertion, removal, and access to the modules within it in a vertical or horizontal orientation, and any angle in between these orientations.

A conduit CC1 and CC2 runs the length of the inside of the pole from one end to the other (top to bottom), mounted on the inside surface of the pole and is split/interrupted at the location of the module access door as illustrated in FIG. 7. The retrieval slide S1 fits loosely enough to slide easily with the pole expansion and contraction under all weather and temperature conditions and has end cradle caps Cap1 and Cap2 which are notched that fit over the conduit. The conduit serves as a guide track to keep the retrieval slide S1 oriented with the access door for easy access to the modules.

A module is defined as one or more functional devices that are designed to fit into retrieval slide S1.

Wiring W3 from the module E1 for power runs to the bottom of the pole for an external supply while wiring W1 from the module E1 also runs along the top portion of the pole above the access door to the camera K1 at the as depicted in FIG. 7.

In this illustrative example, rechargeable batteries B1 B2 B3 and B4 are stacked below electronic module E1 which handles their charging and maintenance, within retrieval slide S1.

W2 is a pull cable that runs to the top of the pole over pulley P1 and then to the top cradle cap Cap1 of slide S1.

S1 is locked in place at a given height relative to the access door by securing W2 with a grommet or other connector to the access door hatch opening when not being serviced. The access door is then shut and usually locked with W2 secured with S1 at a given height within the pole.

In this illustrative example, wiring W1 and W3 are electrical wiring for power and video/data that are attached to the electronics and charging module E1. W4 is power and data access within the pole to camera K1 brought from E1. To access E1, a technician would open the access door and adjust the height of S1 by pulling on adjustment/support cable W2. Enough slack in wires W1 and W3 are present to either disconnect E1 if needed, or slide S1 up the pole so E1 is beyond/above the access door, granting access to each of the batteries beneath it by means of pulling S1 up to expose each of them in front of the access door.

In this illustration module E1 is on top of battery modules B1 B2 B3 and B4, but any number of modules may be stacked in any order within S1 depending on the specific application and camera requirements.

The conduit slide may be round, square, oval, or other shape and protrudes into the inside of the pole enough to be used as a guide for the cradle caps to slide along; and is generally sealed except for the ends such that wires can be run inside to protects against damage and entanglement with the cradle and its contained module as it slides along them.

Because they are sealed except for ends may also be used as a bilge access to remove water from the bottom of the pipe via the access port. They may also be used to circulate air throughout the pole from one end to the other or out of the pole from for cooling or other purposes. In additional embodiments they may be connected through the side, top or bottom of the pole for external air-cooling radiators or geothermal ground cooling and heating loops.

The conduit track CC1 and CC2 comprised of one or more hallow conduit slides attached to the inside of pole and run lengthwise inside the pole; that each terminate at the access door so they may be accessible For this illustrative example in FIGS. 6 7 and 9 they end at the top and bottom of the access port: the top runs to the camera and contains all the power to the camera from the circuit board module; the bottom conduit runs to the ground based power supply.

Further details are shown in FIGS. 7A-7D in which cradle tube slide S1 is shown in detail. The casing connection between the caps Cap1 and Cap 2 is typically a tube that fits with the pole between the caps that is open on part of its circumference (slotted) the width of module access door are shown in cross section examples close up FIG. 7C and FIG. 7D if the pole is circular or rectangular, respectively.

If the orientation of the pole is up and down and S1 is hanging may also be just two or more rods R1. The holes for the rods in the cross section looking at the surface of the end caps Cap1 and Cap2 are illustrated in FIG. 7E. In each of these illustrative examples the casing slots or the rods allow access to the modules as S1 moves up and down/across the front of the access door opening.

FIG. 6 is a detailed illustrative example of S1, showing the round slotted casing version joining the top and bottom caps Cap1 and Cap2 in FIG. 6A and a two rod version in FIG. 6B. Both figures show the notched caps that slid on the top and bottom conduit tracks. FIG. 6A shows the casing of S1, with slot width AL running between the two caps that is the same as the inside access door opening width through the outside of the pole. The AL width may vary in relation to the inside access door opening, so long as it is wide enough to access and service any of the modules stacked within S1 once installed within the pole. The entire length of S1 fully assembled with caps and casing may be of any size that fits within the entire the pole: its length mat be less than or equal to the access inside access door opening height H such that it can be accessed and installed or removed within the pole through this opening, or it can be longer and inserted from either end of the pole prior to installation, or if the pole is installed in the ground vertically, inserted or removed at any time from the top by removing the top Pole cap PCAP1 with Pulley P1 as shown in FIG. 7A. As one illustrative example D1 and D2 are half the length of S1, and are both D1 and D2 are equal in height to the access hatch opening H in FIG. 6C; in this case the upper portion of the cradle slide D1 may be accessed through the access door, and the lower half D2 by pulling the cradle slide upward a distance of D1.

The cradle casing tube may be slotted on both sides (or one or more sides) to access the modules within it from access doors through the outside of the pole located on opposite sides of the pole. In this illustration the cradle slide is slotted on one side, but various embodiments may be slotted anywhere around 360 degrees for module access so long as access through he access doors are not impeded by the conduit track and the corresponding conduit notche(s) in the top and bottom cradle caps: the cradle slots and the conduit tracks can be anywhere so long as they have matching caps, and they do not interfere with module access. In various embodiments the cradle tube has a built-in backplane and wiring harness to facilitate the attachments of modules designed to fit along its length inside it, facilitating wiring and securely fastening modules at locations in the cradle.

FIG. 6A also shows L1 link attachment for lanyard W2 on top of Cap1, as well as the lanyard access hole H1 that allows the cable to pass through Cap1 and be pulled by the technician at the access door. This hole keeps the lanyard cable aligned with the pulley and keeps it from entanglement as it is pulled and released to move S1 up and down the inside of the pole. W2 may also be run to the pulley within conduit track CC1. In an additional embodiment W2 is run within an additional conduit rack CC3 that runs to the top of the pole to the pulley. In this second embodiment Cap 1 is required to have two track notches as shown on FIG. 6D. In additional embodiments, CC3 may also be installed alongside CC2 below the access door, and bottom cap Cap 2 notched to accommodate it, such that both ends of S1 ride on both sets of conduit tracks. In vertical pole installations this lower CC3 may be used for bilge water removal from the bottom of the pole or end to end ventilation and cooling of a fan or pump is installed within S1 to circulate air or coolant from the bottom of the pole to the top.

FIG. 6C shows details looking into the access door, showing power wiring and data wiring W3 and W1 access to the top and bottom conduit tracks CC1 and CC2, as well as the lanyard W2 installed in the third track CC3.

FIG. 1 shows a mounting pole that has access to the rechargeable batteries.

In additional embodiments the manual lanyard W2 may be replaced by an electric winch mounted within S1 and operated by an external switch SW1 located within the access door opening or in another remote location.

In additional embodiments the manual lanyard W2 may be replaced by an electric winch mounted at pole cap PCap1, operating alongside pulley P1.

In additional embodiments with which the pole is not deployed vertically, the cable from Lanyard W2 may be attached to an L1 on each of the end caps Cap 1 and Cap 2 (both ends of S1), running over a pulley at one or both ends of the pole, running inside a dedicated conduit CC3 that runs from one end of the pole to the other, allowing W2 to be pulled to slide S1 horizontally within a non vertical installed pole.

Figure 13:
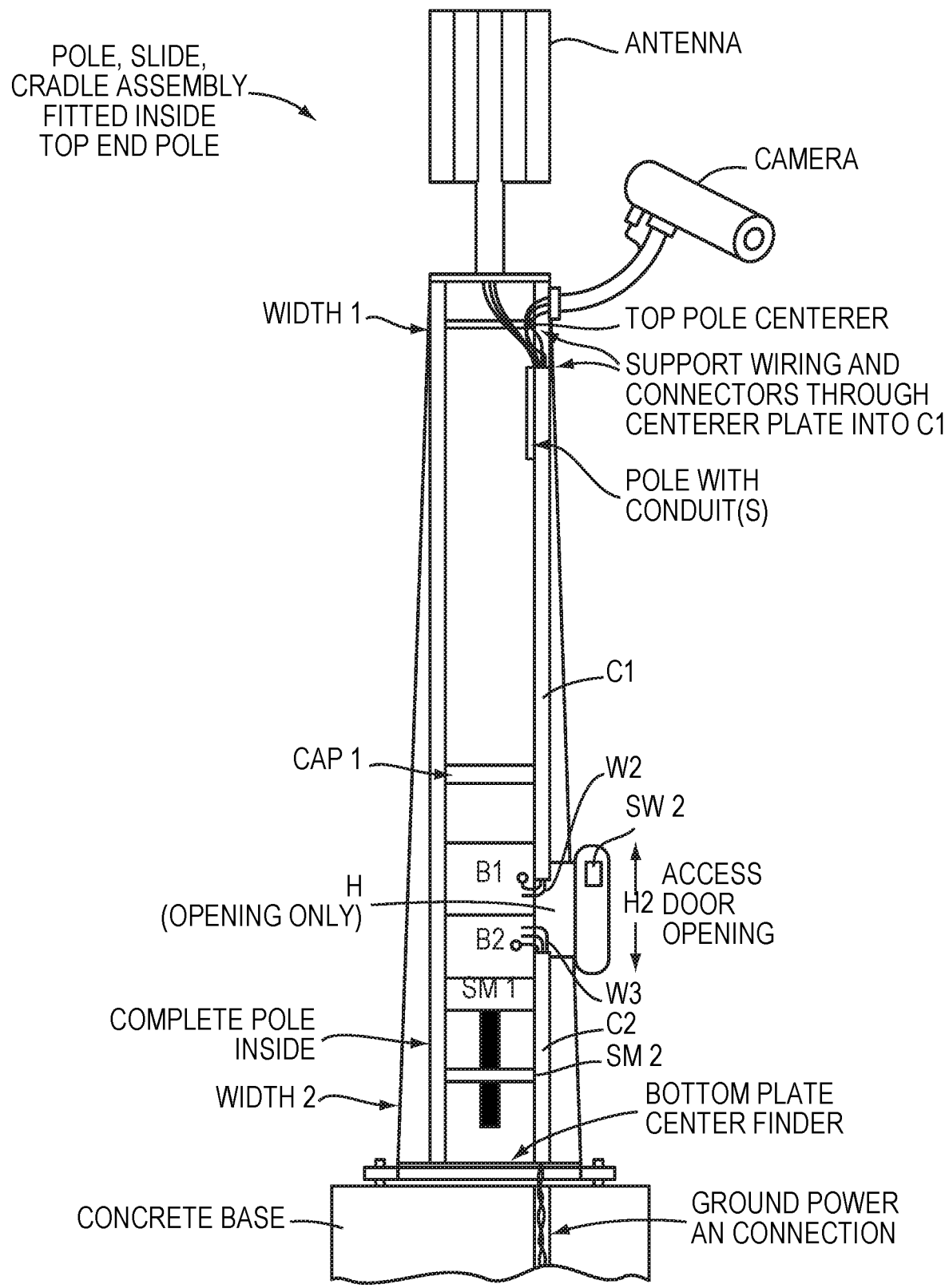
FIG. 13 is a diagram that shows an interior view of the pole in accordance with another novel embodiment.

For illustrative purposes the conduit slide rails are mounted inside a straight, constant diameter (non tapered) pole. In various other embodiments, the rails may run down the middle of a tapered pole with the conduit rails secured on their ends a nominal diameter apart to accommodate the cradle slide end caps. FIG. 13 illustrates the system (pole assembly) with the entire pole, conduit slide, and cradle inserted into a tapered pole that is bolted to a concrete base. The outside diameter of the pole assembly fits inside the tapered end width 1 of the pole and rests on the concrete end width 2 of the tapered pole. The ground access wiring W3 enter into lower conduit C2 of the inner pole assembly through an opening in the bottom centerer plate, while the camera and antenna wires fit through conduit C1. In various embodiments the inner pole assembled has a top plate centerer that fits inside width 1. The wires and support attachments from the camera and antenna assemblies go through a hole opening in the middle of this plate and into C1. The bottom of the inner pole rests on a bottom centerer plate that fits inside width 2, to ensure that the inner pole assembly remains straight from top to bottom of the tapered pole.

Figure 11:
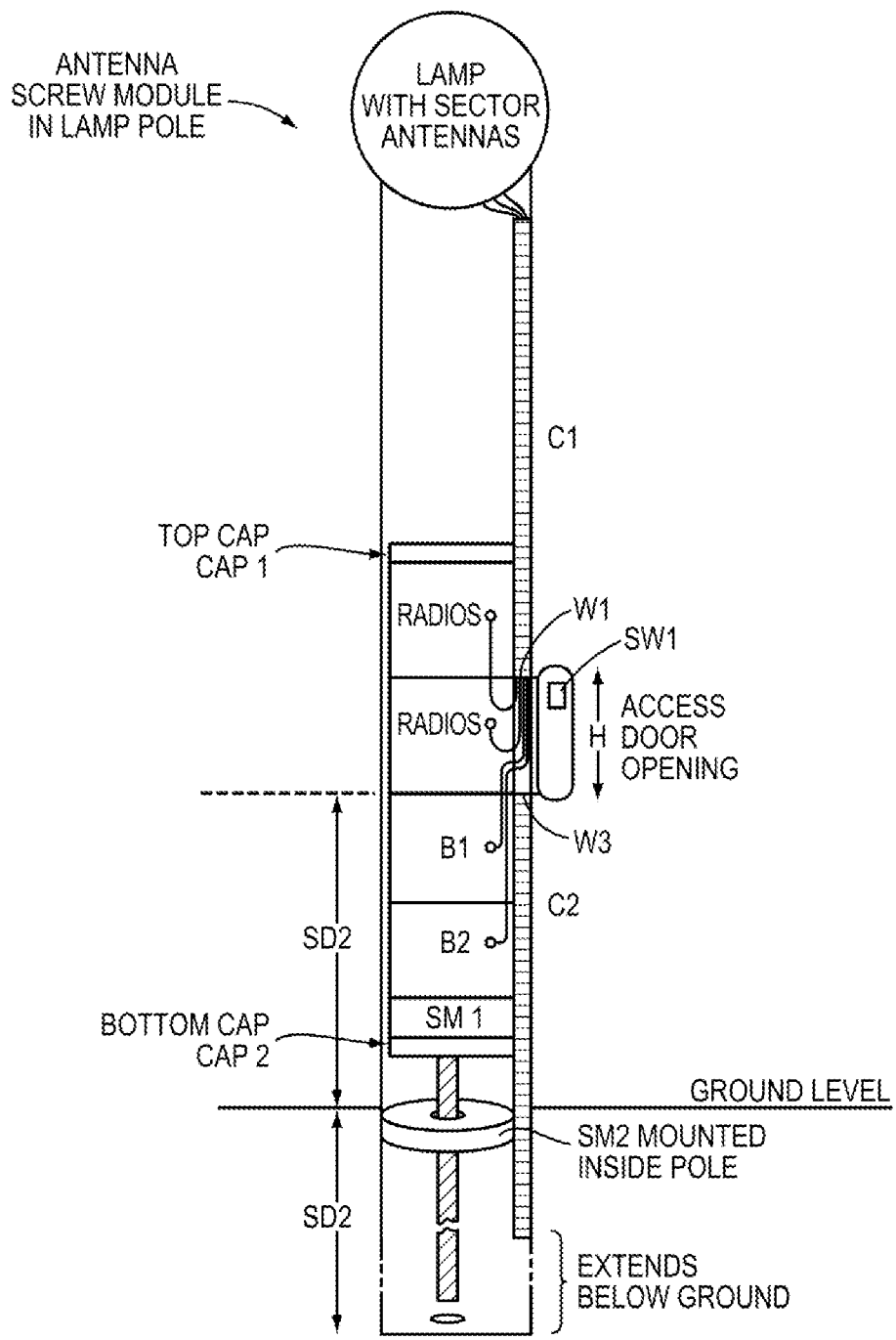
FIG. 11 is a diagram that shows an interior view of the pole in accordance with another novel embodiment.

In this case the access door H is left off the inner pole opening, and the outer door H2 is used. The switch SW2 is mounted on the outside opening door H2 instead of the of the inside H, to run screw module SM1. To use the system within a vertical pole equipped with a screw jack module as illustrated in FIG. 11, a technician would open the access door H. Screw Module SM1 would already be installed mounted on top of the bottom cap2 at the bottom of the cradle casing tube. The threaded screw extends out of the bottom of the cap2 downwards into the pole below ground, running through the already installed thread bushing SM2 secured to the inside of the pole. The position distance between SD1 and the bottom of the access door and the distance required for the thread rod when lowered SD2 is relative to the size of the stack of modules that can be placed inside of the cradle casing. Note that use of the screw module can accommodate a module slide not just within a vertical pole, but a horizontal pole or a pole at any angle in between. It also prevents any possibility of failure to drop the cradle on winch or cable failure.

In this illustration, power and data backhaul comes from the ground via W3 in conduit track C2, while batteries are present as a backup source to run radios for the antenna. Assuming no modules have been loaded yet, the technician would use switch SW1 mounted inside the door to run the screw module to bring the top of the SM1 module of the cradle slide up to the door H. With SW1 is an external power connector to run the winch module SM1. He would then place battery B2 inside the door and plug it into the cradle canister wiring harness/backplane. If the backplane was not present he would keep track of the wires from B2 and lower the cradle canister to first battery B1 on top of B2 and wire accordingly. He would then wire B2 accordingly, lowering the canister again to add Radio1, wiring it in. He would repeat the same with Radio2. Wires and power leading up to the sectored antenna in the lamp W1 would also be wired in accordingly. When finished the tech could lower or raise the cradle canister before closing the access door H.

Figure 12:
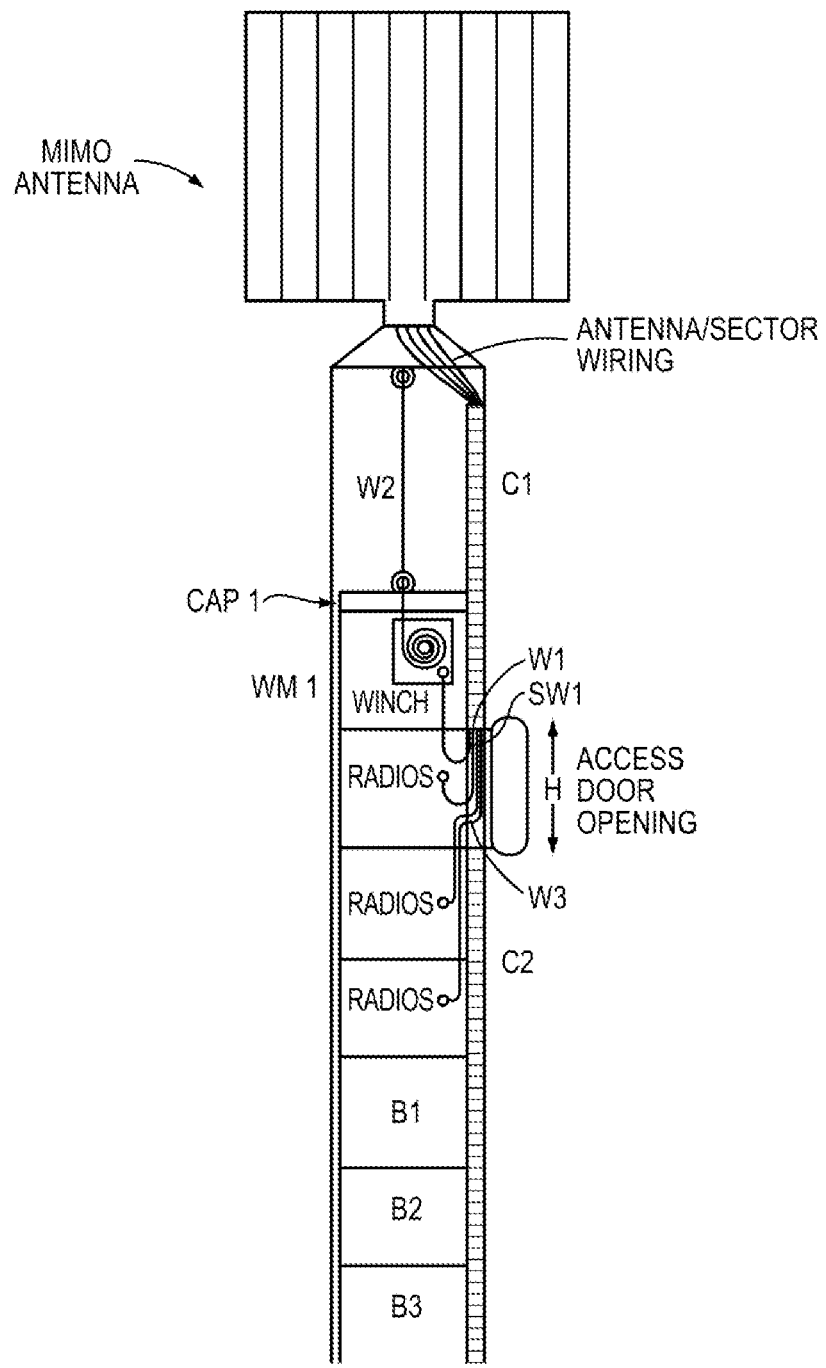
FIG. 12 is a diagram that shows an interior view of the pole in accordance with another novel embodiment.

FIG. 12 is an example of a MIMO multi sector antenna being supported by multiple radios and batteries. In this case winch module WM2 is attached to the tope of the cradle canister cap1, and cap2 is not visible but below B3. The technician powers up the winch and runs it via switch SW1. He may raise the cradle canister casing to access the radios and batteries as needed, with the winch drawing up W2 all the way to the top of the pole to access the entire cradle if needed.

Both FIGS. 11 and 12 use an antenna pole as an illustrative example of using the winch and screw module, but embodiments may have cameras and other devices being supported at the pole. Both FIGS. 10 and 11 assume that data and power are supplied by an external connection near the ground at the base of the pole via W3, but in other embodiments they may be radio and solar respectively, and come from W1 from the top of the pole.

The second part of the system is a cost effective, easy to mount camera access plate that conforms to standard pipe, pipe fitting and pole sizes, providing ease of installation in various locations while at the same time offering tamper resistant and concealed positioning because of its ability to be mounted through the surface and ends of various standard dimensional materials, and not be easily detectible or accessible to damage.

Figure 10:
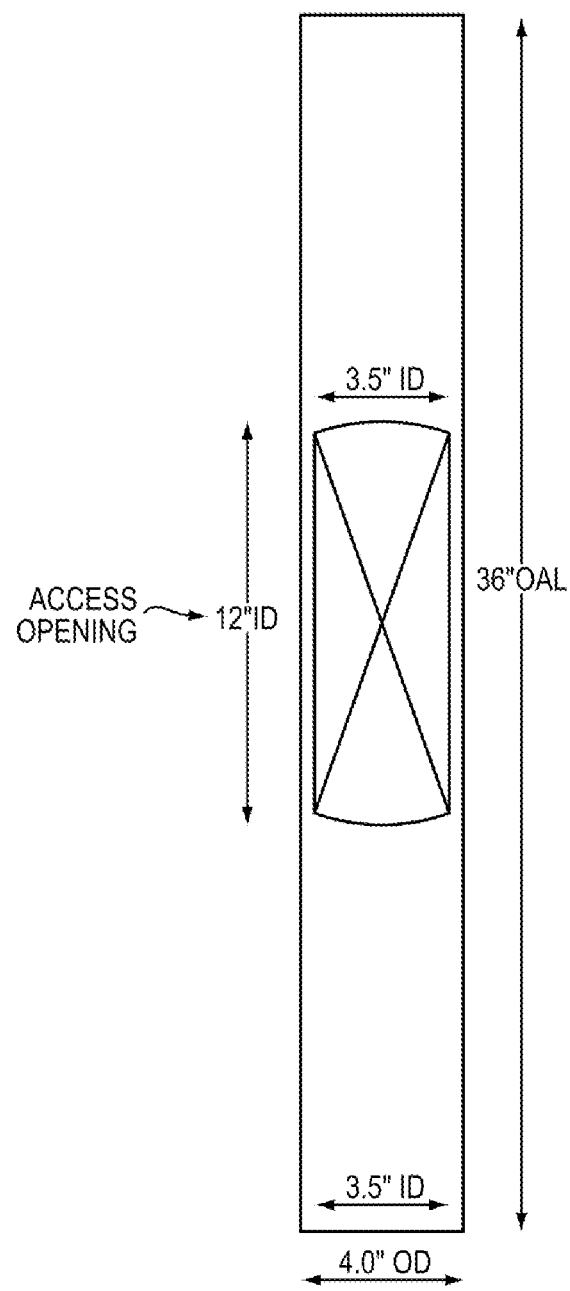
FIG. 10 is a diagram that shows an outer view of the pole.

FIG. 10 is provided for illustrative purposes only, describing a typical access door opening 12" high (long) and 3.5" wide through the side of a 4" diameter pole. As illustrated in the other FIG.s, the module access slide pole has an opening length and width designed to accommodate access to the modules and slide S1 as well as the conduits CC1 CC2 CC3.

The camera access plate of this system is a plate with a diameter of 3.5", that contains configurable mount holes for camera, illuminators, motion and light sensors. Versions of the access plate may be either round or square, rounded square or oval. It is designed to fit as an end cap. In various embodiments the plate can be either round, rectangular, oval, or any other shape that will fit into dimensional structures such as poles, pipes, walls and building eaves.

The plate can accommodate domed or flush mount, angle, dual and a variety of lenses protruding through its front (external image facing side) with mount for a variety of cameras in its back (Internal rear mounted side). The camera plate can accommodate types of lenses and position the camera lenses in a strategic location while concealing the camera behind the lens safely within a pole, tube, wall, or other material structure, thus offering the best possible vantage point for the camera system while offering additional concealment, shelter, and security. For standard piping, tubing, round or rectangular pole shapes, typically being round.

What is claimed is:
1. A system comprising:
   a pole, wherein the pole has an inner surface and an outer surface, and wherein the pole has an access opening that extends from the outer surface to the inner surface;

a conduit track, wherein the conduit track has an inner surface and an outer surface, wherein part of the conduit track is disposed within an interior of the pole, and wherein the conduit track is used to circulate water, air, or other substance to heat, cool, dehumidify, or regulate an environment inside the pole;

a cable disposed along an interior of the conduit track, wherein the cable extends from one end of the conduit track to another end of the conduit track; and a sliding assembly, wherein the sliding assembly is disposed within the interior of the pole, wherein the sliding assembly slides along the conduit track, wherein the cable houses Radio Frequency (RF) lines, fiber optic lines, power lines, or data lines, and wherein an end of the cable extends into at least part of the sliding assembly.

2. The system of claim 1, wherein the sliding assembly comprises:
a top cap;
a bottom cap; and
a support structure, wherein the support structure is adapted to attach to the top cap and to the bottom cap.

3. The system of claim 2, wherein at least one of the top cap and the bottom cap has a conduit notch, and wherein the conduit notch is adapted to slidably engage the conduit track.

4. The system of claim 2, wherein the support structure comprises at least one rod, and wherein the at least one rod has a first end that attaches to the top cap and a second end that attaches to the bottom cap.

5. The system of claim 1, further comprising:
a lift cable, wherein the lift cable is used to slide the sliding assembly along the conduit track.

6. The system of claim 5, wherein the lift cable has a first end and a second end, and wherein the first end of the lift cable attaches to an end of the sliding assembly.

7. The system of claim 5, wherein the second end of the lift cable is accessible through the access opening of the pole, wherein the lift cable is operated manually via a pulley whereby a user is to apply a force to an end of the cable causing the lift assembly to slide along the interior of the pole.

8. The system of claim 5, wherein the lift cable is operated via a motor that controls the lift assembly to slide along the interior of the pole.

9. The system of claim 5, further comprising:
a camera, wherein the camera is attached to an end of the pole, wherein a conductor extends from the camera, through an opening of the pole, through the conduit track, and into part of the sliding assembly.

10. The system of claim 1, further comprising:
an electrical component, wherein the electrical component is disposed within the sliding assembly, and wherein the electrical component is taken from the group consisting of: a power supply, a battery, a memory, a wireless communication module, and a wired communication module.

11. The system of claim 1, wherein the conduit track is a first conduit track of a plurality of conduit tracks, wherein the pole has a first end and a second end, wherein the plurality of conduit tracks are disposed within the interior of the conduit track, wherein the first conduit track extends from the first end of the pole towards the access opening of the pole, and wherein the system further comprising:
a second conduit track, wherein the second conduit track extends from the second end of the pole towards the access opening of the pole, and wherein the first conduit track and the second conduit track are hollow tubular structures.

12. A method comprising:
forming a pole having an interior and an exterior, wherein the pole includes a conduit track having a cable that extends from one end of the conduit track to another end of the conduit track;
placing a pipe within the interior of the pole;
configuring a sliding assembly within the interior of the pole such that the sliding assembly slides along the pipe wherein the cable houses Radio Frequency (RF) lines, fiber optic lines, power lines, or data lines within the conduit track, and wherein an end of the cable extends into at least part of the sliding assembly; and
forming an aperture through the conduit track to the exterior surface of the pole to allow the circulating of water, air, or other material through the conduit track to and from the outside of the pole.

13. The system of claim 12, wherein the sliding assembly has a top cap, a bottom cap, and a support structure, wherein the support structure attaches to the top cap and the bottom cap, and wherein the method further comprises:
extending a cable from an opening of the pole, through the pipe, and into part of the sliding assembly; and
circulating water, air, or other material through the conduit track to heat, cool, dehumidify, or regulate the interior of the pole.

14. A system comprising:
a pole, wherein the pole has an inner surface and an outer surface, and wherein the pole has an access opening that extends from the outer surface to the inner surface;
a conduit track, wherein the conduit track has an inner surface and an outer surface, wherein part of the conduit track is disposed within an interior of the pole;
a cable disposed along an interior of the conduit track, wherein the cable extends from one end of the conduit track to another end of the conduit track;
a sliding assembly, wherein the sliding assembly is disposed within the interior of the pole, wherein the sliding assembly slides along the conduit track, wherein the cable houses Radio Frequency (RF) lines, fiber optic lines, power lines, or data lines, and wherein an end of the cable extends into at least part of the sliding assembly; and
a camera mount faceplate.

15. The system of claim 14, wherein the camera mount faceplate has shape and dimensions of postal regulation mailbox doors.

16. The system of claim 14, wherein the camera mount faceplate has length and width dimensions such that the camera mount faceplate fits over the ends of and within height and width surfaces of dimensional lumber.

17. The system of claim 14, wherein the camera mount faceplate is shaped to fit into and over ends of the pole that has a standard rectangular or structural shape.

18. The system of claim 14, wherein the camera mount faceplate is shaped to fit on the outer surface of the pole, and wherein the pole has a standard diameter.

* * * * *